| (12) | United States Patent<br>Hennig et al. | (10) Patent No.: US 10,385,244 B2<br>(45) Date of Patent: Aug. 20, 2019 |
|---|---|---|

(54) DIRECTLY ATTACHING, HALOGEN-FREE, FAST-DRYING, HEAT-SEALING BINDER FOR SEALING POLYESTER FILMS TO POLYSTYRENE, POLYESTER OR PVC

(71) Applicants: Andre Hennig, Ingelheim (DE); Thomas Arnold, Gelnhausen (DE); Michael Wicke, Seeheim-Jugenheim (DE); Juergen Hartmann, Darmstadt (DE); Bruno Keller, Wackernheim (DE); Guenter Schmitt, Darmstadt (DE); Michael Waldhaus, Reinheim (DE)

(72) Inventors: Andre Hennig, Ingelheim (DE); Thomas Arnold, Gelnhausen (DE); Michael Wicke, Seeheim-Jugenheim (DE); Juergen Hartmann, Darmstadt (DE); Bruno Keller, Wackernheim (DE); Guenter Schmitt, Darmstadt (DE); Michael Waldhaus, Reinheim (DE)

(73) Assignee: Evonik Roehm GmbH, Darmstadt (DE)

(*) Notice: Subject to any disclaimer, the term of this patent is extended or adjusted under 35 U.S.C. 154(b) by 155 days.

(21) Appl. No.: 15/309,698

(22) PCT Filed: May 7, 2015

(86) PCT No.: PCT/EP2015/060057
§ 371 (c)(1),
(2) Date: Nov. 8, 2016

(87) PCT Pub. No.: WO2015/169897
PCT Pub. Date: Nov. 12, 2015

(65) Prior Publication Data
US 2017/0260433 A1 Sep. 14, 2017

(30) Foreign Application Priority Data
May 8, 2014 (DE) .......................... 10 2014 208 608

(51) Int. Cl.
*C09J 167/06* (2006.01)
*C09J 133/10* (2006.01)
*C09J 123/16* (2006.01)
*C09J 5/06* (2006.01)
*C09J 151/08* (2006.01)
*C08F 255/02* (2006.01)
(Continued)

(52) U.S. Cl.
CPC ........... *C09J 167/06* (2013.01); *C08F 255/02* (2013.01); *C08F 255/04* (2013.01); *C08F 283/01* (2013.01); *C08F 283/02* (2013.01); *C09D 151/08* (2013.01); *C09J 5/06* (2013.01); *C09J 123/0815* (2013.01); *C09J 123/16* (2013.01); *C09J 133/10* (2013.01); *C09J 147/00* (2013.01); *C09J 151/06* (2013.01); *C09J 151/08* (2013.01); *C09J 167/00* (2013.01); *C08L 2201/56* (2013.01); *C09J 2201/61* (2013.01); *C09J 2400/166* (2013.01); *C09J 2423/00* (2013.01); *C09J 2423/04* (2013.01); *C09J 2423/16* (2013.01); *C09J 2425/006* (2013.01); *C09J 2433/00* (2013.01); *C09J 2451/00* (2013.01); *C09J 2467/00* (2013.01); *C09J 2467/008* (2013.01)

(58) Field of Classification Search
CPC ...... C09J 167/06; C09J 133/10; C09J 123/16; C09J 5/06; C09J 151/08
USPC ........................................................ 524/504
See application file for complete search history.

(56) References Cited

U.S. PATENT DOCUMENTS

2008/0057205 A1    3/2008   Lohden et al.
2008/0292893 A1*  11/2008   Loehden ............... C08F 283/01
                                                           428/458
(Continued)

FOREIGN PATENT DOCUMENTS

DE      10 2006 009 511 A1    8/2007
DE      10 2006 009 586 A1    9/2007
(Continued)

OTHER PUBLICATIONS

International Search Report dated Jul. 16, 2015 in PCT/EP2015/060057 filed May 7, 2015.
(Continued)

*Primary Examiner* — Deve E Valdez
(74) *Attorney, Agent, or Firm* — Oblon, McClelland, Maier & Neustadt, L.L.P.

(57) ABSTRACT

The present invention comprises a single-component binder for heat-sealing applications which can be used for the sealing of polyester foils, in particular of polyethylene terephthalate foils (PET foils) with respect to containers made of polystyrene, of PVC, and of polyester. These polyesters can in particular be polyethylene terephthalate (PET) or polylactic acid (PLA). The binders here feature not only good seal seam strengths but also in particular good transparency and excellent application properties. A substantive aspect of the invention is that the sealing can be achieved without addition of adhesion promoters, in particular without addition of adhesion promoters based on polyvinyl chloride (PVC) or on polyester, and that barrier properties and sealing properties achieved in respect of containers made of PS and of PET are nevertheless at least comparable with, and sometimes better than, those achieved with heat-sealing systems already marketed.

18 Claims, No Drawings

(51) Int. Cl.
*C08F 255/04* (2006.01)
*C08F 283/01* (2006.01)
*C08F 283/02* (2006.01)
*C09D 151/08* (2006.01)
*C09J 123/08* (2006.01)
*C09J 147/00* (2006.01)
*C09J 151/06* (2006.01)
*C09J 167/00* (2006.01)

(56) References Cited

U.S. PATENT DOCUMENTS

| | | | |
|---|---|---|---|
| 2009/0048401 A1 | 2/2009 | Loehden et al. | |
| 2014/0106638 A1* | 4/2014 | Homma | B32B 27/12 |
| | | | 442/398 |

FOREIGN PATENT DOCUMENTS

| | | | |
|---|---|---|---|
| JP | 2014-228782 A | 12/2014 | |
| JP | 2015-037966 A | 2/2015 | |
| WO | 2006/134042 A1 | 12/2006 | |

OTHER PUBLICATIONS

Lanxess Buna, "Buna EP, Ethylene Propylene Rubber, The Versatile Elastomer", Edition May 2007.
Office Action dated Feb. 12, 2019, in Japanese Patent Application No. 2017-510757 (w/ English translation).

* cited by examiner

DIRECTLY ATTACHING, HALOGEN-FREE, FAST-DRYING, HEAT-SEALING BINDER FOR SEALING POLYESTER FILMS TO POLYSTYRENE, POLYESTER OR PVC

FIELD OF THE INVENTION

The present invention comprises a single-component binder for heat-sealing applications which can be used for the sealing of polyester foils, in particular of polyethylene terephthalate foils (PET foils), with respect to containers made of polystyrene, of PVC, and of polyester. These polyesters can in particular be polyethylene terephthalate (PET) or polylactic acid (PLA). The binders here feature not only good seal seam strengths but also in particular good transparency and excellent application properties. A substantive aspect of the invention is that the sealing can be achieved without addition of adhesion promoters, in particular without addition of adhesion promoters based on polyvinyl chloride (PVC) or on polyester, and that barrier properties and sealing properties achieved in respect of containers made of PS and of PET are nevertheless at least comparable with, and sometimes better than, those achieved with heat-sealing systems already marketed. At the same time, compliance with another requirement is achieved: easy peeling of the lid film from the pot ("smooth peel"). The present invention further comprises a suitable, efficient process for the production of single-component binders for heat-sealing applications which can be used for the sealing of, for example, PET foils with respect to PS containers.

PRIOR ART

Materials used alongside the traditional aluminum lids for closure of plastics containers in food technology, in particular in the case of dairy products, examples being yoghurt pots, are mainly lids made of polyester, in particular of polylactic acid (PLA) or of amorphous polyethylene terephthalate (APET). When these lids are used for closure they have a sealable coating which at the same time provides the aroma barrier for the food with respect to the foil material.

In this context, sealing of transparent APET foils is a very longstanding requirement in the market. Lid materials of this type provide access to new-look food packaging. Use of heat-sealable coatings of the prior art cannot provide this type of packaging together with very good seal seam strength values, because the heat-sealable coatings described have insufficient transparency for these applications.

Sealing of PET foils is usually achieved by means of polyvinyl acetate or polyethylene/polyvinyl acetate, or by means of polyester coatings. These systems do not provide ideal heat-seal seam strength values, and are not transparent.

DE-A 35 31 036 describes plastics foils which can be produced by coextrusion which are composed of a seal layer made of impact-resistant polystyrene, a block copolymer, and a lubricant. Again, this system cannot be produced in transparent form, even if the actual APET has very high transparency. It is moreover known that, in relation to the seal seam strength values to be achieved, coextruded foils are less preferred than coated systems in which the coating can undergo a desired microphase separation during drying, because the former provide lower seal seam strength.

However, EP-A 0 406 681 correctly draws attention to the problems with use of heat-sealable plastics foils to replace aluminum foil. A restrictive factor generally apparent is the substantially narrower processing range. There is mostly a very narrow processing range of from 10° C. to 20° C.; in order to guarantee problem-free production and fully satisfactory use of the sealed pack, it is necessary to ensure fairly constant compliance with this range. Compliance with this precondition is not always achieved in fill systems which have a plurality of cavities for simultaneous pot filling. EP 0 406 681 addressed the object of inter alia improving the polystyrene-based foils that can be produced by the coextrusion process of DE 35 31 036 in a manner that increases processing range and process reliability. A further intention was to ensure fully satisfactory production in fill systems including those with a plurality of fill cavities. In practice, this results in use of relative high sealing temperatures, with corresponding requirements relating to the quality of the plastics foils. EP 0 406 681 complies with these requirements by using a sealable plastics foil produced by the coextrusion process or by lamination, made of two layers A and C, and optionally of a layer B, and also optionally a respective layer of an adhesion promoter D for the bonding of, in each case, two of the layers A, optionally B, and C, composed of from 1% to 50% of a layer of a heat-sealable, impact-resistant polystyrene A, up to 95% of a supportive layer B, and from 1% to 99% of a high-melting point plastics layer C, where the sum of the thicknesses, or of the weight, of A and optionally B, and C is in each case 100. However, systems of that type are very complicated to realize, and also not transparent.

EP 1 891 174 and EP 1 989 258 in turn describe heat-sealing dispersions composed of at least one polyolefin, of a polymethacrylate, of a polyester and of a polyolefin-graft-polymethacrylate copolymer. The dispersion of EP 1 891 258 here additionally comprises a polyester-graft-polymethacrylate copolymer. However, the proportion of polyolefin here is in each case at least 10% by weight, based on the solids content of the dispersions. Although it is thus possible to seal not only aluminum foils but also PET foils with respect to polypropylene (PP) as pot material, the coatings have almost no transparency, and are produced by a process that is complicated and therefore expensive. This inhibits widespread use. EP 2 495 282 in turn describes a heat-sealing dispersion for closure of PET foils with respect to polystyrene pots. This dispersion comprises exclusively polyesters, poly(meth)acrylates, and polyester-graft-polymethacrylate copolymers. However, it has been found that these dispersions have reduced shelflife, and that the heat-seal-seam strength values achievable are not adequate.

Object

It was an object of the present invention, via development and formulation of suitable polymers, to provide heat-sealable coatings which are suitable for sealing PET foils and PET-coated foils with respect to various pot materials, in particular with respect to polystyrene, polyester, or PVC. The polyesters of the polyester foil are in particular paper-polyethylene-terepthalate composite materials, single-side-aluminum-coated PET foils (AluPET), and foils made of amorphous polyethylene terephthalate (A-PET).

A particular object of the present invention was that the heat-sealable coating on the pot material is to exhibit markedly better transparency than the prior art, together with high seal seam strength values and uniform peel behavior during opening ("smooth peel").

Another object was to achieve adequately high closure strength values with the usual cycle times used during the heat-sealing of plastics foils.

Another object was to develop a heat-sealable-coating binder which can be produced more easily, and with fewer components, than the prior art.

Another object was to achieve high bond strength even at relatively high temperatures directly after sealing (high heat resistance), since this achieves short cycle times during sealing of the foil, and for the food packager.

Other objects not explicitly mentioned will be apparent from the entirety of the description, claims, and examples below.

Achievement of Objects

The objects are achieved by a heat-sealable coating system suitable for the sealing of various types of substrates, comprising a film-forming dispersion, characterized in that said dispersion comprises from 10 to 60% by weight, preferably from 25 to 45% by weight, of a polyester or polyester mixture as polymer type A, from 10 to 60% by weight, preferably from 20 to 45% by weight of a poly(meth)acrylate as polymer type B, from 1 to 20% by weight, preferably from 5 to 15% by weight, of a graft copolymer of polymer type A and polymer type B as polymer type AB, from 1 to 30% by weight, preferably from 5 to 25% by weight, of a polyolefin as polymer type C, and from 1 to 35% by weight, preferably from 5 to 25% by weight, of a graft copolymer as polymer type CD, composed of polymer type C and of a poly(meth)acrylate as polymer type D, based in each case on the total mass of the polymer types A, B, C, AB, and CD.

Another feature of the coating system of the invention is that the proportion of the polymer type C, inclusive of the proportions in polymer type CD, based on said total mass of polymer types A, B, C, AB and CD, is from 5 to 40% by weight, where from 10% to 40% of the carbons of the main chain of the polymer type C are tertiary carbon atoms. Another feature of the coating system of the invention is that the solids content of the dispersion is from 25 to 70% by weight.

Surprisingly, it has been found that adequately high bond strength values of the closure are achieved at the usual cycle times used during the heat-sealing of plastics foils. High bond strength, and high heat resistance associated therewith, was moreover achieved even at relatively high temperatures directly after sealing. It is thus possible to achieve short cycle times during sealing.

Other advantages of the composition of the invention are good adhesion on various commercially available polyester foils, for example with respect to PS, examples being mixpap, PET36, and AluPET, or indeed on aluminum-foil foils.

Other advantages can be seen in peel behavior on opening, examples being smooth peel and the complete absence of cobwebbing. The coating of the invention moreover has better transparency than existing heat-sealable coatings, although the binder itself does not exhibit improved transparency. The compositions of the invention are moreover available by way of a relatively simple production process.

The Polymer Type A

The person skilled in the art is in principle easily capable of selecting the polyesters of the polymer type A that are suitable for the coating composition of the invention. A very wide range of polyesters can be used here. Selection criteria available to the person skilled in the art are particularly the solubility of the polyester in the respective solvent and—for food-contact applications—the appropriate approval of said component under food legislation.

Materials that can preferably be used as polymer type A in the invention are on the one hand copolyesters which feature itaconic acid as monomer unit (polyester A1). Equal preference is on the other hand given according to the invention to use of polyesters which are free from monomers comprising polymerizable double bonds and whose number-average molar mass ($M_n$) is greater than 5000 g/mol (polyester A2), and which thus bring about the adhesion to the PET foil.

In a particularly preferred embodiment of the present invention, the polymer type A is a mixture of the polyester A1 with number-average molar mass $M_n$ from 700 to 5000 g/mol, preferably from 2000 to 4000 g/mol, produced with copolycondensation of itaconic acid, and of the polyester A2 with number-average molar mass $M_n$ from 5000 to 50 000 g/mol, preferably from 10 000 to 35 000 g/mol, which has no double bonds. The component of the polymer type AB here exclusively comprises polyester A1 as polymer type A.

This preferred coating system particularly comprises, based on the total mass of the polymer types A, B, C, AB, and CD, inclusive of the proportions of the polyester A1 in the polymer type AB, from 1 to 15% by weight, preferably from 5 to 12% by weight, very particularly preferably from 7 to 10% by weight, of the polyester A1 and from 10 to 50% by weight, preferably from 20 to 40% by weight, very particularly preferably from 25% by weight to 35% by weight, of the polyester A2.

As alternative to said particularly preferred embodiment, the coating system can also comprise other polymer types A which are entirely, or else only to some extent, a polyester which has been produced with copolycondensation of itaconic acid and which particularly preferably has properties the same as those described above for the polyester A1.

It is preferable that the polyesters A1 have a linear or branched structure and are characterized by OH numbers of from 20 to 150 mg KOH/g, preferably from 25 to 50 mg KOH/g, acid numbers of less than 10 mg KOH/g, preferably less than 5 mg KOH/g, and particularly less than 2 mg KOH/g, and number-average molar mass from 700 to 5000 g/mol, preferably from 2000 to 4000 g/mol. Hydroxy number (OHN) is determined in accordance with DIN 53240-2. Acid number is determined in accordance with DIN EN ISO 2114. Molar mass is determined by means of gel permeation chromography (GPC). The samples were characterized in tetrahydrofuran eluent in accordance with DIN 55672-1.

The content of itaconic acid in the polyesters A1 can particularly be in the range from 0.1 mol % to 20 mol %, preferably from 1 mol % to 10 mol %, very particularly preferably from 2 mol % to 8 mol %, based on the total quantity of polycarboxylic acids used. In other respects, the nature of the polycarboxylic acids used for the copolyesters of the invention is per se as desired. It is thus possible that aliphatic and/or cycloaliphatic and/or aromatic polycarboxylic acids are present. The expression "polycarboxylic acid" means compounds which preferably bear more than one, and particularly preferably two, carboxy groups; a difference from the generally accepted definition is that in particular embodiments said expression also covers monocarboxylic acids.

Examples of aliphatic polycarboxylic acids having relatively short chains are succinic acid, glutaric acid, adipic acid, azelaic acid, sebacic acid, dodecanedioic acid, tetradecanedioic acid and octadecanedioic acid. Examples of cycloaliphatic polycarboxylic acids are the isomers of cyclohexanedicarboxylic acid. Examples of aromatic polycarboxylic acids are the isomers of benzenedicarboxylic acid and trimellitic acid. It is also optionally possible to use, instead of the free polycarboxylic acids, the esterifiable derivatives thereof, e.g. corresponding lower alkyl esters, or cyclic anhydrides.

The nature of the polyols used for the hydroxypolyesters of the invention is per se as desired: aliphatic and/or cycloaliphatic, and/or aromatic polyols can thus be present. The expression "polyols" means compounds which preferably bear more than one, in particular preferably two, hydroxy groups; a difference from the generally accepted definition is that in particular embodiments said expression also covers monohydroxy compounds.

Examples of polyols are ethylene glycol, 1,2-propanediol, 1,3-propanediol, 1,4-butanediol, 1,5-pentanediol, 1,6-hexanediol, 1,9-nonanediol, 1,12-dodecanediol, neopentyl glycol, butylethyl-1,3-propanediol, methyl-1,3-propanediol, methylpentanediols, cyclohexanedimethanols, trimethylolpropane, pentaerythritol, and mixtures thereof.

The expression "aromatic polyols" means reaction products of aromatic polyhydroxy compounds, for example hydroquinone, bisphenol A, bisphenol F, dihydroxynaphthalene, etc. with epoxides, for example ethylene oxide or propylene oxide. Polyols present can also be etherdiols, i.e. oligomers or polymers based by way of example on ethylene glycol, propylene glycol, or 1,4-butanediol. Particular preference is given to linear aliphatic glycols.

It is also possible to use lactones, alongside polyols and dicarboxylic acids, for the synthesis of the hydroxy polyesters.

The polyesters A1 of the invention are produced by using traditional methods for (poly)condensation reactions.

The polyesters A2, equally preferred for the purposes of the invention, in particular have a linear, optionally slightly branched structure, and are preferably characterized by an OH number from 1 to 15 mg KOH/g, preferably from 5 to 10 mg KOH/g, an acid number less than 10 mg KOH/g, preferably less than 5 mg KOH/g, and particularly preferably less than 2 mg KOH/g, and number-average molar mass $M_n$ from 5000 to 50 000 g/mol, preferably from 10 000 to 35 000 g/mol. The glass transition temperatures ($T_g$) of the polyesters A2 are moreover particularly advantageously in the range from 25 to 45° C., preferably from 30 to 35° C. Glass transition temperature is measured by using DSC (Differential Scanning calorimetry) in accordance with DIN EN ISO 11357-1. The values stated are taken from a second heating cycle.

In the case of the materials of the polyester A2 type, it is essential that no monomers are used which comprise double bonds capable of polymerization with (meth)acrylates; this means by way of example absence of itaconic acid.

In other respects it is generally possible to use, for the production of the polymer type A type 2, monomers the same as those mentioned during the description of the type 1.

The Polymer Types B and D

The polymer type B is formed alongside the graft copolymer AB during the production of the dispersion of the invention. The description below also applies to the composition of the B chains in the product constituent AB:

Polymer type and chain segment B are defined as being composed of polyacrylate sequences and/or polymethacrylate sequences. These are per se, e.g. in the form of a corresponding homo- or copolymer, soluble in the solvent system L. The polymer B is generally composed of standard methacrylates and optionally acrylates. Polymer type B is particularly composed of MMA, butyl (meth)acrylate, ethyl (meth)acrylate, and/or propyl (meth)acrylate. The expression "(meth)acrylate" here means methacrylates, acrylates, or a mixture of methacrylates and acrylates. Other suitable monomers for the polymer type B can be found by way of example in EP 1 989 258, where the functional monomers likewise listed in that reference are restricted in the invention to OH functionalities, acid functionalities, and silyl functionalities.

It is particularly preferable that polymer type B is composed of more than 50% by weight, preferably from 80% by weight to 100% by weight, of MMA and/or butyl methacrylate.

There can be up to 20% by weight, preferably up to 10% by weight, and particularly preferably from 0 to 5% by weight, of functional monomers included in the polymer in order to provide an additional increase in heat-seal strength in relation to particular materials. These functional monomers can by way of example be acids, in particular acrylic acid, methacrylic acid, or itaconic acid. Somewhat less preference is given to monomers having an OH group, for example particularly 2-hydroxyethyl (meth)acrylate or 3-hydroxypropyl (meth)acrylate.

Polymer type B can moreover comprise regulators in order to establish the desired range of molecular weight. Mention may be made of MTMO (3-mercaptopropyl trimethoxysilane) and n-DDM (n-dodecyl mercaptan) as examples of sulfur-containing regulators.

The particular proportion and composition of the polymer B is advantageously selected with regard to the desired technical function.

Component B can also particularly take the form of mixture of various poly(meth)acrylates, where only one of these various (meth)acrylate compositions forms the constituents B of the polymer component AB.

The structure of polymer type D, present as constituent of the polymer types CD, particularly as side chains grafted onto polymer type C, can be analogous with that of polymer type B. It is particularly preferable here that the compositions of the components B and D are identical. During the graft reaction of the monomers of the polymer type B onto polymer type C it is moreover possible that homopolymers are formed, i.e. poly(meth)acrylates that are not grafted. In the invention, these homopolymers are a constituent of the polymer type B, which can—as described—take the form of mixture of various poly(meth)acrylates.

The Polymer Type C

The polyolefins to be used in the invention, corresponding to polymer type C, are known per se. They are primarily EPM, hydrogenated polybutadienes, or copolymers of ethylene and of an α-olefin having from 4 to 12 carbon atoms, in particular of ethylene and butene or/and octene, and/or hexene. Weight-average molecular weight $M_w$ is generally from 10 000 to 250 000, preferably from 50 000 to 150 000.

EPM is ethylene-propylene copolymers. Distribution here can be substantially random, but it is also advantageously possible to use sequential polymers having ethylene blocks. The ethylene:propylene monomer ratio here can vary within certain limits, which can be set at about 95% for ethylene and about 95% for propylene, as upper limit. Examples of suitable EPMs are described by way of example in the laid-open German specifications DE-A 16 44 941, DE A 17 69 834, DE-A 1939 037, DE-A 19 63 039, and DE A 20 59 981. The EPDMs likewise described in those references are markedly less suitable in the invention, because these can increase the opacity of the coating.

Particular preference is given to components of the polymer type C which comprise a proportion of from 20 to 70% by weight of repeating ethylene units. Repeating units of this type are not restricted to those obtained directly by copolymerization of ethylene, but can also arise via 1,4-linkage of a butadiene and subsequent hydrogenation of the resultant polybutadiene.

The Polymer Type AB

Production of the Graft Polymers AB

The process of the invention for the production of a graft copolymer AB features reaction of a suitable initiator described at a later stage below with graftable groups, in particular with double bonds of repeating itaconic acid units in the polymer of the type A, to form reactive centers for free-radical polymerization of (meth)acrylates. The expression "reactive centers" means polymer chains which comprise one or more initiator units for free-radical polymerization. These initiator units can be formed simultaneously or else at different times. It is thus also very possible that itaconic acid units are activated only after other free radicals formed at other itaconic acid units have been deactivated by termination reactions.

The graft polymer AB is generally produced by grafting on the component A, under reaction conditions suitable for this purpose, monomers that lead to the component B. Correspondingly, the polymer type AB is preferably a graft copolymer having a polyester main chain and a poly(meth)acrylate side chain.

By way of example, a solution of strength from 10 to 65% by weight, preferably from 30 to 45% by weight, of an itaconic-acid-containing polyester in a suitable solvent which is inert under polymerization conditions and which normally has a boiling point above the process temperature is produced. Examples of solvents that can be used are acetic esters such as ethyl, propyl, or butyl acetate, aliphatic solvents such as isooctane, cycloaliphatic solvents such as cyclohexane, and carbonylic solvents such as butanone.

The monomers that lead to the polymer type B are added to these polyester solutions, and polymerization is carried out with addition of one or more preferably peroxidic free-radical initiators at temperatures of from −10° C. to 100° C. within a period that is usually from 4 to 8 hours. It is desirable, as far as possible, to achieve complete conversion. It is preferable to use, as free-radical initiator, azo compounds such as AIBN, or peresters such as tert-butyl peroctoate. The initiator concentration depends on the number of desired grafting sites, and on the desired molecular weight of the segment B. The initiator concentration is generally from 0.1 to 3% by weight, based on the polymer.

It is also possible to make concomitant use of chain-transfer agents in order to establish the desired molecular weight of the segments B. Examples of suitable chain-transfer agents are sulfur chain-transfer agents, in particular chain-transfer agents comprising mercapto groups, e.g. the chain-transfer agents described in the section relating to polymer type B. The concentrations of chain-transfer agents are generally from 0.1% by weight to 1.0% by weight, based on the entire polymer.

The graft copolymers of the polymer type AB can be synthesized not only by the solution polymerization method described but also in bulk. For this, the polyesters are dissolved in the (meth)acrylic monomer mixture before the free-radical polymerization is initiated.

Free-radical initiator can alternatively also be used as initial charge in a melt of the polyester, the monomer mixture then being admixed therewith.

The Polymer Type CD

Production of the Graft Polymers CD

The graft polymer CB is generally produced by—optionally with the aid of a suitable emulsifier—producing a dispersion of the component C and grafting onto this, under reaction conditions suitable for this purpose, monomers that lead to polymer type B and, respectively, D. The processes for the production of suitable emulsifiers of the type CB are known per se: by way of example it is possible to proceed by the transfer grafting method: (cf. also Houben-Weyl, Methoden der Org. Chemie [Methods of organic chemistry], vol. 1411, p. 114, H. A. J. Battaerd, G. W. Tregear, Polymer Reviews, vol. 16, Interscience (1967)).

By way of example, a solution of strength from 10 to 50% by weight, preferably from 20 to 40% by weight, of a polyolefin of the polymer type C in a suitable solvent which is inert under polymerization conditions and which normally has a boiling point above the process temperature is produced. Examples of solvents that can be used are butyl acetate, aliphatic, cycloaliphatic, and aromatic hydrocarbons, and also mixtures of these. The monomers in the desired ratios are added to these solutions, and polymerization is carried out with the addition of one or more preferably peroxidic free-radical initiators at temperatures of from 50° C. to 120° C., usually within 4 to 8 hours. It is desirable, as far as possible, to achieve complete conversion. It is preferably to use peresters such as tert-butyl peroctoate. The initiator concentration depends on the number of desired grafting sites, and on the desired chain lengths of the segments D. The initiator concentration is generally from 0.2 to 3.0% by weight, based on the polymer.

It is also possible to make concomitant use of chain-transfer agents in order to establish the desired molecular weight of the segments B. Examples of suitable chain-transfer agents are sulfur chain-transfer agents, in particular chain-transfer agents comprising mercapto groups, e.g. the chain-transfer agents listed in the section relating to polymer type B. The concentrations of chain-transfer agents are generally from 0.1% by weight to 1.0% by weight, based on the entire polymer. Another method for the production of the graft polymers CB provides the hydroperoxidation of a polyolefin as first step. The hydroperoxide groups thus formed, located in the chain, can initiate graft polymerization of the vinyl monomers in a following stage. (cf. H. A. J. Battaerd, G. W. Tregear, Polymer Reviews loc. cit.).

In a particular embodiment, grafting of polymer type B onto polymer type A and of polymer type D onto polymer type C can take place simultaneously, in order to produce the graft copolymers AB and CD. The (statistical) composition of the side chains B and D here is identical. In the invention the resultant homopolymers are counted with polymer type B.

Alternatively, it is also possible to blend the polymer types AB and CD, preference being given here to simultaneous synthesis, since the dispersion thus produced has greater stability. The problem of phase separation can be reduced when comparison is made with simple blending.

In a third alternative, the polymer type AB is synthesized in the presence of the already grafted polymer type CD, of the ungrafted polymer type C, and of the polymer type B formed during the synthesis of polymer type CD. This procedure can lead to formation of additional side chains on polymer type CD and to formation of additional polymers CD. Indeed, it is thus possible that polymer type CD having side chains D of different composition is present.

It is also possible to synthesize the polymer type CD analogously, and with analogous effects, in the presence of the polymer types AB, A, and B.

The coating composition of the invention can also comprise, alongside the polymer types A, B, AB, C and CD described, other components such as adhesion promoters, stabilizers, abrasion improvers, or antioxidants. Examples of these additional materials based on polymers are the polymer types E and $E_A$.

A formulation with polymer type E is an option for improving aluminum adhesion: improvement of Al adhesion can be observed as a result of priming the foil or of adding from 0.1 to 10% by weight, preferably from 0.1 to 5% by weight of an adhesion-improving terpolymer to the coating formulation. An example of the product used is VINY-LITE® VMCH (marketed by Union Carbide).

Polymer type $E_A$ can optionally be added in order to reduce possible abrasion during processing. By way of example, it is possible to use a polyamide, e.g. of the VESTOSIND 2159 (Evonik Ind. AG) type. The proportion of this added in a formulation can be from 0.1 to 10% by weight, preferably from 0.1 to 5% by weight.

The Solvent System

The coating composition of the invention also comprises a solvent system L, alongside the polymer types A, B, and C, the graft polymers AB and CD, and optionally the polymer type E or $E_A$, and also other optional added materials.

The selection of the solvents to be used for the solvent system L is to be such that they meet the requirements of coating technology for plastics and metals. The solvents to be used—optionally a mixture—should be inert and entirely nonhazardous, and as far as possible the boiling point 105° C. at 760 torr is not exceeded here.

By way of example, a mixture of esters of aliphatic carboxylic acids with aliphatic alcohols, ketones, and aliphatic hydrocarbons can be used as solvent. Examples of aliphatic carboxylic acids are acetic acid and propionoic acid. Aliphatic alcohols that can be used are ethanol, propanol, isopropanol, n-butanol, 2-butanol, 2-methyl-1-propanol, and 2-methyl-2-propanol. Suitable examples of ketones are acetone and ethyl methyl ketone. Particular examples of aliphatic hydrocarbons are pentane, hexane, heptane, octane, isooctane, nonane, decane, undecane, and dodecane. The aliphatic hydrocarbons can also be present in the form of their isomer mixtures, and in mixtures with one another. It is also possible to use cycloalkanes and substituted cycloalkanes.

Mixtures of the solvents described above can also be used for the carrier system. The proportion of the solvent system, based on the polymer dispersions concentrated in the invention, can by way of example be 75% by weight, or in a particularly advantageous case as little as 30% by weight, preferably less than 67% by weight, in practical situations mostly from 55% by weight to 40% by weight.

Other materials that can moreover be added to the heat-sealable coating system suitable for the sealing of various types of substrates are, as described, the auxiliaries and additives usually used for heat-sealing.

Another constituent of the present invention, alongside the coating composition described, is a process for the sealing of two materials with the aid of the coating composition of the invention.

This process for the sealing of polyester foils or of PET-coated foil with respect to polystyrene, polyester, and polyvinyl chloride particularly features coating of the foil with the coating system of the invention, drying of the coating, placing of the coated side of the foil onto the material to be sealed, made of polystyrene, polyester, or PVC, and sealing at a temperature of from 160 to 220° C. and with a pressure of from 2 to 6 m Pas over a period of from 0.1 to 1 s.

The drying here can be achieved at subatmospheric pressure, preferably at a temperature above the highest boiling point of the components of the solvent system.

Production of the Heat-Sealing System
Synthesis with the Polymer Types A-D
Alternative A:

A suitable emulsifier is used, as explained above, to produce a dispersion or, given suitable polymer compatibility, a homogeneous solution of the components A and C in the solvent system L, and monomers of the type I-V that lead to the component B are simultaneously grafted under suitable reaction conditions onto the components A and C. The ratios by weight of the proportions of A and B are generally from 1:5 to 5:1. The ratio by weight of A to C is generally from 1:2 to 10:1, preferably from 1:1 to 5:1.

The total polymer content, based on the entire dispersion, is at least 10% by weight, desirable proportions in practical situations here being from 40% by weight to 80% by weight, normally from 45% by weight to 60% by weight.

The process of the invention gives, in dispersion, heat-sealable coating compositions which have adequate stability for the processing method. The dispersions are stable for at least a plurality of days, normally a plurality of weeks to months.

This provides many application sectors for the coating systems of the invention. Particular importance is attached to the uses of coating systems as claimed in claim 1 which can heat-seal polyester foils or PET-coated foils with respect to polystyrene, polyester, and polyvinyl chloride. Coating systems as claimed in claims 4 and 13 are used in the heat-sealing of polyester foils and aluminum foil, and aluminum- and PET-coated foils, with respect to polystyrene, polyester, polyvinyl chloride. The coating systems as claimed in claims 2, 11, and 15 are used in the heat-sealing of polyester foil and aluminum foil, and aluminum- and PET-coated foils, with respect to polystyrene, polyester and polyvinyl chloride.

The examples given below illustrate the present invention, without restricting the invention to the features disclosed therein.

Materials:
Foil Material and Pot Material Used:
paper/aluminum/polyester-foil-composite foil (e.g. Flexpap, Constantia)
PET foil, thickness 36 µm, untreated, transparent
Pot material used: polystyrene thermoforming foils from Fernholz and APET pot foils (purchased from Derschlag)
Component A:
Table 1 lists the characteristics of the copolyesters (type A1 and A2) used here as examples of the component A. The materials here are semiaromatic or linear copolyesters with different itaconic acid contents, based on total quantity of polycarboxylic acids.

TABLE 1

Characteristics of the polyesters used

| Polyester | Itaconic acid content | $T_g$ | $M_w$ |
|---|---|---|---|
| Type A1 | 3.0 mol % | 33° C. | 15 800 |
| Type A2 | 0 mol % | 30° C. | 40 900 |

By way of example, DYNACOLL EP 415.02 (Evonik) can be used as polyester of the type 1.

By way of example, DYNAPOL L 323 (Evonik) can be used as polyester of the type 2.
Component C:

TABLE 2

Characteristics of the polyolefins used

| Name | Description | MFR [dg/min] | Mooney Viscosity ML (1 + 4) [MU] | Tg [° C.] |
|---|---|---|---|---|
| Dutral CO 043 | Ethylene-propene | — | 33** | — |
| Engage 7447 | Ethylene-butene | 5* | — | −53[1)] |
| Engage 8407 | Ethylene-octene | 30* | — | −54[1)] |
| Keltan EPG 5170 | EPDM[2)] | — | 59*** | — |

MFR = melt flow rate:
*190° C., 2.16 kg;
Mooney Viscosity: 100° C., *125° C.
[1)]DSC measurement, DOW method,
[2)]EPDM = ethylene-propylene-diene rubbers
Dutral can be purchased from Polimeri, Engage can be purchased from DOW, and Keltan can be purchased from Lanxess.
Solids content (SC) is determined in a drying oven (1 h at 105° C.).

Dynamic viscosity is determined with a Brookfield LVDV-II+Pro viscosimeter at 23° C. with spindle II at 6 rpm.

Laboratory Application of the Heat-Sealing Solution

After dilution to application viscosity, the heat-sealing solution was applied by drawing on a K hand coater No. 3. Dry layer thicknesses of from 4 to 7 μm were thus obtained.

Laboratory Drying of the Coated Foils

Paper-aluminum-PET-composite foil: After a short period of air-drying (from 5 to 10 minutes), the foils were dried in a convection oven at from 120° C. to 200° C. for 15 seconds.

Heat-Sealing and Determination of Seal Seam Strength

Heat-sealing equipment (HSG/ET) from Brugger was used to carry out the sealing processes.
Sealing Conditions:
Temperature: 180° C.
Pressure: 3 bar
Time: 0.5 sec.
Sealing area: 100×10 mm Seal seam strength was determined by cutting samples into strips of width 15 mm and using a tensile tester from Instron, model No. 1195, or Zwick, model No. 1454 to subject same to tension at velocity 100 mm/min. Care was taken that during the peel test the angle between the foil parts already separated and the as yet unstressed remainder was 90°.

Opacity was determined by coating the transparent PET36 foil with the binders as described above and then carrying out the test in accordance with ASTM D1003 in a "haze-gard plus" from BYK Gardner.

Production of the Heat-Sealing Binders

INVENTIVE EXAMPLE 1

65.0 g of Dutral CO 043, 26.0 g of polyester of the type A1, and 104.0 g of polyester of the type A2, and also 120.0 g of a suitable emulsifier, were used as initial charge in 335 g of propyl acetate and 60.0 g of cyclohexane (CH) in a jacketed vessel with attached thermostat, reflux condenser, blade stirrer, and internal thermometer, and stirred at 95° C. until the material had dissolved. A mixture of 64.9 g of methyl methacrylate and 64.9 g of butyl methacrylate, with 2.60 g of admixed tert-butylperoxy 2-ethylhexanoate, is metered into the system by means of a metering pump over a period of 1.5 h at 95° C. Once addition has ended, a further 0.26 g of tert-butylperoxy 2-ethylhexanoate is added twice, with one hour between each addition, and the mixture is stirred for a further 2 h.

INVENTIVE EXAMPLE 2

86.0 g of Engage 7447, 32.3 g of polyester of the type A1, and 97.8 g of polyester of the type A2, and also 80.0 g of a suitable emulsifier, were used as initial charge in 336 g of propyl acetate and 18.7 g of cyclohexane (CH) in a jacketed vessel with attached thermostat, reflux condenser, blade stirrer, and internal thermometer, and stirred at 95° C. until the material had dissolved. A mixture of 64.5 g of methyl methacrylate and 64.5 g of butyl methacrylate, with 2.58 g of admixed tert-butylperoxy 2-ethylhexanoate, is then metered into the system by means of a metering pump over a period of 1.5 h at 95° C. Once addition has ended, the reaction mixture is stirred for a further 5 h at 95° C., and finally diluted with 8.7 g of CH and 18.7 g of methyl ethyl ketone (MEK) for viscosity adjustment.

INVENTIVE EXAMPLE 3

The procedure for the production of inventive example 3 is exactly the same as in inventive example 2. 86.0 g of Engage 8407 are used instead of Engage 7447.

INVENTIVE EXAMPLE 4

68.8 g of Dutral CO 043, 34.4 g of polyester of the type A1, and 103.2 g of polyester of the type A2, and also 80.0 g of a suitable emulsifier, were used as initial charge in 335 g of propyl acetate and 37.3 g of cyclohexane (CH) in a jacketed vessel with attached thermostat, reflux condenser, blade stirrer, and internal thermometer, and stirred at 95° C. until the material had dissolved. A mixture of 64.9 g of methyl methacrylate and 64.9 g of butyl methacrylate, with 2.60 g of admixed tert-butylperoxy 2-ethylhexanoate, and 0.28 g of the chain-transfer agent DYNASILAN MTMO (Evonik Industries AG) is then metered into the system by means of a metering pump over a period of 1.5 h at 95° C. Once addition has ended, a further 0.26 g of tert-butylperoxy 2-ethylhexanoate is added twice, with one hour between each addition, and the mixture is stirred for a further 2 h.

INVENTIVE EXAMPLE 5

86.0 g of Dutral CO 043, 32.3 g of polyester of the type A1, and 96.8 g of polyester of the type A2, and also 80.0 g of a suitable emulsifier, were used as initial charge in 313 g of propyl acetate and 60.0 g of cyclohexane (CH) in a jacketed vessel with attached thermostat, reflux condenser, blade stirrer, and internal thermometer, and stirred at 95° C. until the material had dissolved. A mixture of 64.5 g of methyl methacrylate and 64.5 g of butyl methacrylate, with 2.60 g of admixed tert-butylperoxy 2-ethylhexanoate, is then metered into the system by means of a metering pump over a period of 1.5 h at 95° C. Once addition has ended, a further 0.26 g of tert-butylperoxy 2-ethylhexanoate is added twice, with one hour between each addition, and the mixture is stirred for a further 2 h.

COMPARATIVE EXAMPLE 1 (CE1)

42.9 g of an EPDM and 20.0 g of an itaconic acid-containing polyester of the type 1 are dispersed in a mixture of 50.0 g of propyl acetate, 20.0 g of ethyl acetate and 10.0 g of isooctane at 90° C. in a jacketed vessel with attached thermostat, reflux condenser, blade stirrer, and internal thermometer. The following are added to this mixture: firstly 2.0 g of tert-butylperbenzoate, and then a mixture of 18.5 g of n-butyl methacrylate and 18.5 g of methyl methacrylate, over a period of 90 min. Polymerization is then carried out at 90° C. over a period of 120 min. Finally, a further 0.5 g tert-butylperoxy 2-ethylhexanoate is added for post-initiation, and the mixture is stirred at 90° C. for a further 90 min.

COMPARATIVE EXAMPLE 2 (CE2)

35.2 g of propyl acetate and 30 g of polyester of the type A1 are used as initial charge in a jacketed vessel with attached thermostat, reflux condenser, blade stirrer, and internal thermometer. The polyester is completely dissolved at 95° C. with stirring, and 0.06 g of tert-butyl 2-ethylperhexanoate is then admixed. In order to obtain an ideal yield of free radicals along the polyester chains, this solution is stirred at 90° C. for a period of 30 min before a mixture of 9.50 g of methyl methacrylate, 9.50 g of butyl methacrylate, 1.00 g of butyl acrylate, and 0.15 g of tert-butyl 2-ethylperhexanoate is metered into the system by using a metering pump within 2 h. In order to reduce residual monomer content, the mixture is then stirred with 0.15 g of tert-butyl 2-ethylperhexanoate at 90° C. for a further 4 h. The mixture is diluted with 31.3 g of propyl acetate for solution viscosity adjustment. After 150 min of total reaction time, the polymer solution is cooled, and diluted with 13.5 g of propyl acetate to reduce solution viscosity.

COMPARATIVE EXAMPLE 3 (CE3)

66.9 g of propyl acetate and 30 g of polyester of the type A1 are used as initial charge in a jacketed vessel with attached thermostat, reflux condenser, blade stirrer, and internal thermometer. The polyester is completely dissolved at 95° C. with stirring, and 0.06 g of tert-butyl 2-ethylperhexanoate is then admixed. In order to obtain an ideal yield of free radicals along the polyester chains, this solution is stirred at 90° C. for a period of 30 min before a mixture of 17.50 g of methyl methacrylate, 17.50 g of butyl methacrylate, 1.00 g of butyl acrylate, and 0.15 g of tert-butyl 2-ethylperhexanoate is metered into the system by using a metering pump within 2 h. In order to reduce residual monomer content, the mixture is then stirred with 0.15 g of tert-butyl 2-ethylperhexanoate at 90° C. for a further 4 h.

Experimental Results

TABLE 3

Properties of the binder

| Example | Dyn. visc. [mPas] | SC (%) | Appearance |
|---|---|---|---|
| 1 | 2 900 | 47.5 | white, disperse |
| 2 | 2 000 | 47.3 | white, disperse |
| 3 | 2 000 | 47.1 | white, disperse |
| 4 | 3 300 | 47.0 | white, disperse |
| 5 | 3 100 | 47.8 | white, disperse |
| CE1 | 2 800 | 47.2 | white, disperse |
| CE2 | 3 900 | 54.1 | white, disperse |
| CE3 | 2 000 | 44.9 | white, disperse |

All of the inventive examples and comparative examples exhibit solids-viscosity ratios that firstly ensure processability for users and secondly meet the requirement to achieve the highest possible solids contents.

Heat-Sealing Properties

TABLE 4

Heat-seal-seam strength values of the inventive examples, sealed with respect to PS pot material

| | | | | Example | | | |
|---|---|---|---|---|---|---|---|
| Foil | | 1 | 2 | 3 | 4 | 5 | 5 48 h storage in water |
| Mixpap | HSS [N/15 mm] | 5.9 | 8.6 | 7.7 | 4.4 | 6.6 | 6.6 |
| | Appearance of seal | r.u. | nonuniform | nonuniform | u. | u. | u. |
| AluPET | HSS [N/15 mm] | — | 8.2 | 8.2 | 4.6 | 7.2 | 7.5 |
| | Appearance of seal | | r.u. | r.u. | r.u. | u. | r.u. |
| PET36 | HSS [N/15 mm] | — | 4.1 | 5.4 | 3.0 | 5.3 | 5.5 |
| | Appearance of seal | | nonuniform | nonuniform | r.u. | u. | r.u. |
| Aluminum | HSS [N/15 mm] | 6.0 | 10.6 | 10.6 | 7.5 | 7.1 | 7.7 |
| | Appearance of seal | r.u. | nonuniform | u. | u. | u. | r.u. |

HSS: heat-seal strength;
r.u.: relatively uniform peel;
u.: uniform peel (smooth peel)

TABLE 5

Heat-seal-seam strength values of the comparative examples, sealed with respect to PS pot material

| Foil | Example | CE1 | CE2 | CE3 |
|---|---|---|---|---|
| Mixpap | HSS [N/15 mm] | 8.0 | <1 | 1.1 |
| | Appearance of seal | nonuniform | — | nonuniform |
| AluPET | HSS [N/15 mm] | 7.6 | n.d. | n.d |
| | Appearance of seal | nonuniform | — | — |
| PET36 | HSS [N/15 mm] | 4.8 | n.d. | n.d. |
| | Appearance of seal | nonuniform | — | — |
| Aluminum | HSS [N/15 mm] | 9.6 | n.d. | n.d. |
| | Appearance of seal | nonuniform | — | — | n.d.: not determined, because HSS is inadequate on Mixpap foil

TABLE 6

Heat-seal seam strength values of inventive example 5,
sealed with respect to APET pot material

| Foil | Mixpap | AluPET | PET36 | Aluminum |
|---|---|---|---|---|
| HSS [N/15 mm] | 7.0 | 8.1 | 5.1 | 7.8 |

TABLE 7

Comparison of opacity of the coated foils

| Example | Layer thickness [μm] | Haze [%] |
|---|---|---|
| PET36-foil | 36 | 3.9 |
| 1 | 4-5 | 17 |
| 2 | 4-5 | 25 |
| 3 | 4-5 | 18 |
| 4 | n.d. | n.d. |
| 5 | 4-5 | 23 |
| CE 1 | 4 | 60 |

The invention claimed is:

1. A heat-sealable coating system suitable for the sealing of a substrate, the coating system comprising a film-forming dispersion, wherein the dispersion comprises
    from 10% to 60% by weight of a polyester or a polyester mixture as a polymer A,
    from 10% to 60% by weight of a poly(meth)acrylate as a polymer B,
    from 1% to 20% by weight of a graft copolymer comprising the polymer A and the polymer B as a polymer AB,
    from 1% to 30% by weight of a polyolefin as a polymer C, and
    from 1 to 35% by weight of a graft copolymer as a polymer CD, comprising the polymer C and a poly(meth)acrylate as a polymer D,
    based on the total mass of the polymers A, B, C, AB, and CD,
    wherein the total amount of the polymer C, inclusive of the amount of the polymer C in the polymer CD, based on the total mass of the polymers A, B, C, AB, and CD, is from 5 to 40% by weight,
    wherein from 10% to 40% of the carbon atoms of the main chain of the polymer C are tertiary carbon atoms,
    wherein the solids content of the dispersion is from 25 to 70% by weight,
    wherein the polymer C is at least one selected from the group consisting of an ethylene-propylene copolymer, a hydrogenated polybutadiene, and a copolymer of ethylene and an α-olefin having from 4 to 12 carbon atoms, and
    wherein the polymer C comprises from 20 to 70% by weight of repeating ethylene units and has a weight-average molecular weight $M_w$ of from 10000 to 250000.

2. The coating system according to claim 1, wherein polymer A is a mixture comprising
    a polyester A1 with a number-average molar mass $M_n$, from 700 to 5000 g/mol, obtained by a copolycondensation of itaconic acid, and
    a polyester A2 with a number-average molar mass $M_n$, from 5000 to 50000 g/mol which has no double bonds, and
    wherein the polymer AB comprises only the polyester A1 as the polymer A.

3. The coating system according to claim 2, wherein the number-average molar mass $M_n$ of the polyester A1 is from 2000 to 4000 g/mol and the number-average molar mass $M_n$ of the polyester A2 is from 10000 to 35000 g/mol, and
    wherein the coating system comprises, based on the total mass of the polymers A, B, C, AB, and CD, inclusive of the amount of the polyester A1 in the polymer AB, from 1% by weight to 15% by weight of the polyester A1 and from 10% by weight to 50% by weight of the polyester A2.

4. The coating system according to claim 1, wherein the polymer A is fully or partially a polyester obtained by a copolycondensation of itaconic acid.

5. The coating system according to claim 2, wherein the polymer A, the polyester A1, or both are a polyester obtained by a copolycondensation reaction of itaconic acid and at least one additional polycarboxylic acid wherein a proportion of itaconic acid in reacted form, based on the total quantity of polycarboxylic acids reacted, is from 0.1 mol % to 20 mol %.

6. The coating system according to claim 2, wherein the polymer A, the polyester A1, or both are a polyester obtained by a copolycondensation reaction of itaconic acid and at least one additional polycarboxylic acid wherein a proportion of itaconic acid in reacted form, based on the total quantity of polycarboxylic acids reacted, is from 2 mol % to 8 mol %.

7. The coating system according to claim 1, wherein the polymer AB is a graft copolymer comprising a polyester main chain and poly(meth)acrylate side chains.

8. The coating system according to claim 1, wherein the graft copolymers AB and CD are obtained by a grafting of the polymer B onto the polymer A and a grafting of the polymer D onto the polymer C wherein both of the graftings are carried out simultaneously, and wherein the polymer B and polymer D have the same composition.

9. A process for sealing a polyester foil or a polyethylene terephthalate coated foil with a material comprising at least one selected from the group consisting of polystyrene, polyester, and polyvinyl chloride, the process comprising:
    coating the polyester or polyethylene terephthalate coated foil with the coating system according to claim 1 to form a side of the foil comprising a coating,
    drying the coating, and
    placing the side of the foil comprising a coating onto the material to be sealed comprising at least one selected from the group consisting of polystyrene, polyester, and polyvinyl chloride, and
    sealing at a temperature of from 160 to 220° C. and with a pressure of from 2 to 6 mPas over a period of time from 0.1 to 1 s to form a sealed object.

10. A sealed object obtained by the process according to claim 9.

11. The process according to claim 9, wherein the sealed object exhibits a uniform peel or a smooth peel behavior during opening.

12. The process according to claim 9, wherein the sealed object has an opacity measured as a haze percentage as determined in accordance with ASTM D1003 of 10-30%.

13. The process according to claim 9, wherein the sealed object has a reduced opacity measured as a haze percentage as determined in accordance with ASTM D1003 relative to a substantially similar sealed object obtained by a substantially similar process employing a coating system that does not comprise the polymer C wherein from 10% to 40% of the carbon atoms of the main chain of the polymer C are tertiary carbon atoms.

14. The process according to claim 9, wherein the sealed object has an increased heat-seal-seam strength relative to a substantially similar sealed object obtained by a substantially similar process employing a coating system that does not comprise the polymer C wherein from 10% to 40% of the carbon atoms of the main chain of the polymer C are tertiary carbon atoms.

15. The process according to claim 9, wherein the foil is a polyester foil, the material comprises polystyrene and the sealed object has a heat-seal-seam strength of greater than 8.1 N/15 mm.

16. The process according to claim 9, wherein the foil is a polyethylene terephthalate coated foil, the material comprises polystyrene and the sealed object has a heat-seal-seam strength of greater than 5.0 N/15 mm.

17. The process according to claim 9, wherein the foil is a single-side-aluminum-coated polyethylene terephthalate foil, the material comprises polystyrene and the sealed object has a heat-seal-seam strength of greater than 7.7 N/15 mm.

18. The process according to claim 9, wherein the material comprises polyester in the form of amorphous polyethylene terephthalate and the sealed object has a heat-seal-seam strength of greater than 5.0 N/15 mm.

* * * * *